United States Patent
Nayak et al.

(10) Patent No.: US 12,103,523 B2
(45) Date of Patent: Oct. 1, 2024

(54) METHOD, APPARATUS, AND COMPUTER PROGRAM PRODUCT FOR IDENTIFYING WRONG-WAY DRIVEN VEHICLES

(71) Applicant: HERE GLOBAL B.V., Eindhoven (NL)

(72) Inventors: Amarnath Nayak, Mumbai (IN); Jerome Beaurepaire, Berlin (DE)

(73) Assignee: HERE GLOBAL B.V., Eindhoven (NL)

( * ) Notice: Subject to any disclaimer, the term of this patent is extended or adjusted under 35 U.S.C. 154(b) by 225 days.

(21) Appl. No.: 17/450,207

(22) Filed: Oct. 7, 2021

(65) Prior Publication Data

US 2023/0111391 A1    Apr. 13, 2023

(51) Int. Cl.
| | |
|---|---|
| *B60W 30/095* | (2012.01) |
| *B60Q 9/00* | (2006.01) |
| *B60W 30/09* | (2012.01) |
| *B60W 40/04* | (2006.01) |
| *G06V 20/58* | (2022.01) |

(52) U.S. Cl.
CPC ......... *B60W 30/0956* (2013.01); *B60Q 9/008* (2013.01); *B60W 30/09* (2013.01); *B60W 40/04* (2013.01); *G06V 20/584* (2022.01); *B60W 2554/806* (2020.02); *B60W 2556/40* (2020.02); *B60W 2556/45* (2020.02)

(58) Field of Classification Search
None
See application file for complete search history.

(56) References Cited

U.S. PATENT DOCUMENTS

| | | | |
|---|---|---|---|
| 10,089,877 B2 | 10/2018 | Offenhaeuser et al. | |
| 10,089,878 B2 | 10/2018 | Cummings, II et al. | |
| 10,351,131 B2 * | 7/2019 | Al-Deek | G08G 1/167 |
| 2015/0145699 A1 * | 5/2015 | Mielenz | F02M 25/089 340/935 |
| 2017/0018178 A1 * | 1/2017 | Poechmueller | G08G 1/09626 |
| 2018/0032040 A1 * | 2/2018 | Sweet, III | H04N 7/181 |
| 2020/0175289 A1 | 6/2020 | May | |
| 2021/0217208 A1 * | 7/2021 | Tang | G06V 30/413 |

(Continued)

FOREIGN PATENT DOCUMENTS

| | | | | | |
|---|---|---|---|---|---|
| CN | 112750317 A | * | 5/2021 | ......... | G06K 9/00798 |
| KR | 101416457 | | 8/2014 | | |

OTHER PUBLICATIONS

Machine translation of Lu (CN-112750317-A) (Year: 2023).*

(Continued)

*Primary Examiner* — Aniss Chad
*Assistant Examiner* — Jennifer M Anda

(57) ABSTRACT

A method, apparatus and computer program product are provided for automatically identify wrong-way driven vehicles in real-time on a roadway. Methods may include: receiving an image from at least one image sensor captured at a location; processing the image using a computer vision model to detect features within the image; identifying, using the computer vision model, a wrong-way driven vehicle in the image; incrementing a confidence value for detection of the wrong-way driven vehicle; and generating an alert indicating the presence of the wrong-way driven vehicle at the location in response to the confidence value satisfying a predetermined value.

18 Claims, 5 Drawing Sheets

(56) References Cited

U.S. PATENT DOCUMENTS

| | | | | |
|---|---|---|---|---|
| 2022/0139225 A1* | 5/2022 | Joyce | ............... | G08G 1/04 |
| | | | | 455/404.2 |
| 2022/0185312 A1* | 6/2022 | Hegde | ............... | G08G 1/056 |
| 2022/0208007 A1* | 6/2022 | Arora | ............... | G01S 13/931 |
| 2022/0297688 A1* | 9/2022 | Park | ............... | B60W 50/14 |
| 2022/0301319 A1* | 9/2022 | Horiba | ............... | G06V 20/58 |
| 2023/0360533 A1* | 11/2023 | Kashihara | ............... | G08G 1/09 |

OTHER PUBLICATIONS

"Bosch's Wrong-Way Driver Warning System Now A Feature in ŠKODA Vehicles", Retrieved on Dec. 21, 2021, Retrieved from the Internet: <URL: https://tiresandparts.net/news/boschs-wrong-way-driver-warning-system-now-a-feature-in-skoda-vehicles/#>, (Feb. 11, 2021), 2 pages.

Baratian-Ghorghi et al., "Prediction of Potential Wrong-Way Entries at Exit Ramps of Signalized Partial Cloverleaf Interchanges", Traffic Injury Prevention, vol. 16, No. 6, (Nov. 2014), 6 pages.

Rogers, Jr. et al., "Modeling the Risk of Wrong Way Driving on Freeways and Toll Roads", Transportation Research Record: Journal of the Transportation Research Board, No. 2554, (Jan. 2016), 166 pages.

Tao et al., "Wrong Roadway Detection for Multi-Lane Roads" Lecture Notes in Computer Science, (Aug. 2013), 8 pages.

\* cited by examiner

METHOD, APPARATUS, AND COMPUTER PROGRAM PRODUCT FOR IDENTIFYING WRONG-WAY DRIVEN VEHICLES

TECHNOLOGICAL FIELD

Example embodiments of the present invention relate generally to identifying wrong-way driven vehicles, and more particularly, to a method, apparatus, and computer program product to automatically identify wrong-way driven vehicles in real-time on a roadway.

BACKGROUND

Vehicle safety has been a focus for development and improvement since vehicles were first developed. Vehicle features such as crumple-zones, seat belts, air bags, and autonomous vehicle controls such as automatic braking are evidence of the relatively rapid development of safety features that has occurred in recent decades. Vehicle safety continues to improve and together with improvements in safety, vehicle speeds have increased with better roads and better vehicle technology.

The focus of vehicle safety for years has largely been on developing vehicles that are resilient to impacts and designing passenger compartments of vehicles that protect occupants in the event of an impact. Features that protect passengers during vehicle crashes are often heavy, such as structural bracing that protects the passenger compartment of a vehicle. As vehicle efficiency has been a parallel focus with vehicle safety, the addition of weight to vehicles is undesirable. To that end, vehicle safety developments have also been focused on accident avoidance including features that may not sacrifice vehicle weight for safety improvements. Features such as antilock brakes and traction control have improved vehicle safety through accident avoidance.

More recent developments in vehicle safety have been in the field of accident or impact avoidance using autonomous vehicle controls. Autonomous vehicles and vehicles with at least some degree of autonomous can apply brakes to slow a vehicle ahead of a detected imminent impact. However, until accidents and impacts are entirely eliminated, accident avoidance will continue to be a focus of safety development in vehicles.

BRIEF SUMMARY

Accordingly, a method, apparatus, and computer program product are provided for identifying wrong-way driven vehicles, and more particularly, to a method, apparatus, and computer program product to automatically identify wrong-way driven vehicles in real-time on a roadway. In a first example embodiment, an apparatus is provided including at least one processor and at least one memory including computer program code, the at least one memory and the computer program code may be configured to, with the at least one processor, cause the apparatus to: receive an image from at least one image sensor captured at a location; process the image using a computer vision model to detect features within the image; identify, based on features detected using the computer vision model, a wrong-way driven vehicle in the image; increment a confidence value for detection of the wrong-way driven vehicle; and generate an alert indicating the presence of the wrong-way driven vehicle at the location in response to the confidence value satisfying a predetermined value.

According to some embodiments, the computer vision model is trained based on a plurality of images to detect a front-side of a vehicle. The apparatus of some embodiments is further caused to focus attention of the at least one image sensor on the wrong-way driven vehicle in response to the apparatus identifying the wrong-way driven vehicle in the image. The apparatus of some embodiments is further caused to allocate additional processing capacity to the at least one image sensor in response to the apparatus identifying the wrong-way driven vehicle in the image. Causing the apparatus of some embodiments to allocate additional processing capacity to the at least one image sensor further includes causing the apparatus to increase an image capture rate of the at least one image sensor.

According to some embodiments, the apparatus is further caused to cause at least one action to be taken in response to the alert indicating the presence of the wrong-way driven vehicle, where the at least one action includes autonomous activation of one or more of: vehicle lights, vehicle brakes, vehicle steering, or vehicle horn. The apparatus of some embodiments is further caused to provide the alert to one or more vehicles proximate the location in a direction of travel of the wrong-way driven vehicle. The apparatus of some embodiments is caused to provide the alert to at least one of emergency services, law enforcement, or a transportation department. Causing the apparatus of some embodiments to identify, based on features detected using the computer vision model, a wrong-way driven vehicle in the image includes causing the apparatus to: identify a vehicle and a heading of the vehicle in the image; determine a direction of travel of a road segment along which the vehicle is driving based on map data associated with the location; and identify the wrong-way driven vehicle in the image based on the heading of the vehicle being opposite the direction of travel of the road segment.

Embodiments provided herein include a computer program product having at least one non-transitory computer-readable storage medium having computer-executable program code instruction stored therein, the computer-executable program code instructions including program code instructions to: receive an image from at least one image sensor captured at a location; process the image using a computer vision model to detect features within the image; identify, using the computer vision model, a wrong-way driven vehicle in the image; increment a confidence value for detection of the wrong-way driven vehicle; and generate an alert indicating the presence of the wrong-way driven vehicle at the location in response to the confidence value satisfying a predetermined value. The computer vision model of some embodiments is trained based on a plurality of images to detect a front-side of a vehicle.

The computer program product of some embodiments includes program code instructions to focus attention of the at least one image sensor on the wrong-way driven vehicle in response to the program code instructions identifying the wrong-way driven vehicle in the image. The computer program product of some embodiments includes program code instructions to allocate additional processing capacity to the at least one image sensor in response to the program code instructions identifying the wrong-way driven vehicle in the image. The program code instructions to allocate additional processing capacity to the at least one image sensor further comprise program code instructions to increase an image capture rate of the at least one image sensor.

The computer program product of some embodiments further includes program code instructions to cause at least one action to be taken in response to the alert indicating the presence of the wrong-way driven vehicle, where the at least one action includes autonomous activation of one or more of: vehicle lights, vehicle brakes, vehicle steering, or vehicle horn. Embodiments may include program code instructions to provide the alert to one or more vehicles proximate the location in a direction of travel of the wrong way driven vehicle. The computer program product of some embodiments includes program code instructions to provide the alert to at least one of emergency services, law enforcement, or a transportation department. The program code instructions to identify, based on features detected using the computer vision model, a wrong-way driven vehicle in the image includes, in some embodiments, program code instructions to: identify a vehicle and a heading of the vehicle in the image; determine a direction of travel of a road segment along which the vehicle is driving based on map data associated with the location; and identify the wrong-way driven vehicle in the image based on the heading of the vehicle being opposite the direction of travel of the road segment.

Embodiments provided herein include a method including: receiving an image from at least one image sensor captured at a location; processing the image using a computer vision model to detect features within the image; identifying, using the computer vision model, a wrong-way driven vehicle in the image; incrementing a confidence value for detection of the wrong-way driven vehicle; and generating an alert indicating the presence of the wrong-way driven vehicle at the location in response to the confidence value satisfying a predetermined value. According to some embodiments, identifying, using the computer vision model, a wrong-way driven vehicle in the image includes: identifying a vehicle and a heading of the vehicle in the image; determining a direction of travel of a road segment along which the vehicle is driving based on map data associated with the location; and identifying the wrong-way driven vehicle in the image based on the heading of the vehicle being opposite the direction of travel of the road segment.

Embodiments provided herein include an apparatus including: means for receiving an image from at least one image sensor captured at a location; means for processing the image using a computer vision model to detect features within the image; means for identifying, based on features detected using the computer vision model, a wrong-way driven vehicle in the image; means for incrementing a confidence value for detection of the wrong-way driven vehicle; and means for generating an alert indicating the presence of the wrong-way driven vehicle at the location in response to the confidence value satisfying a predetermined value. According to some embodiments, the means for identifying, using the computer vision model, a wrong-way driven vehicle in the image includes: means for identifying a vehicle and a heading of the vehicle in the image; means for determining a direction of travel of a road segment along which the vehicle is driving based on map data associated with the location; and means for identifying the wrong-way driven vehicle in the image based on the heading of the vehicle being opposite the direction of travel of the road segment.

The above summary is provided merely for purposes of summarizing some example embodiments to provide a basic understanding of some aspects of the invention. Accordingly, it will be appreciated that the above-described embodiments are merely examples and should not be construed to narrow the scope or spirit of the invention in any way. It will be appreciated that the scope of the invention encompasses many potential embodiments in addition to those here summarized, some of which will be further described below.

BRIEF DESCRIPTION OF THE DRAWINGS

Figure 1:
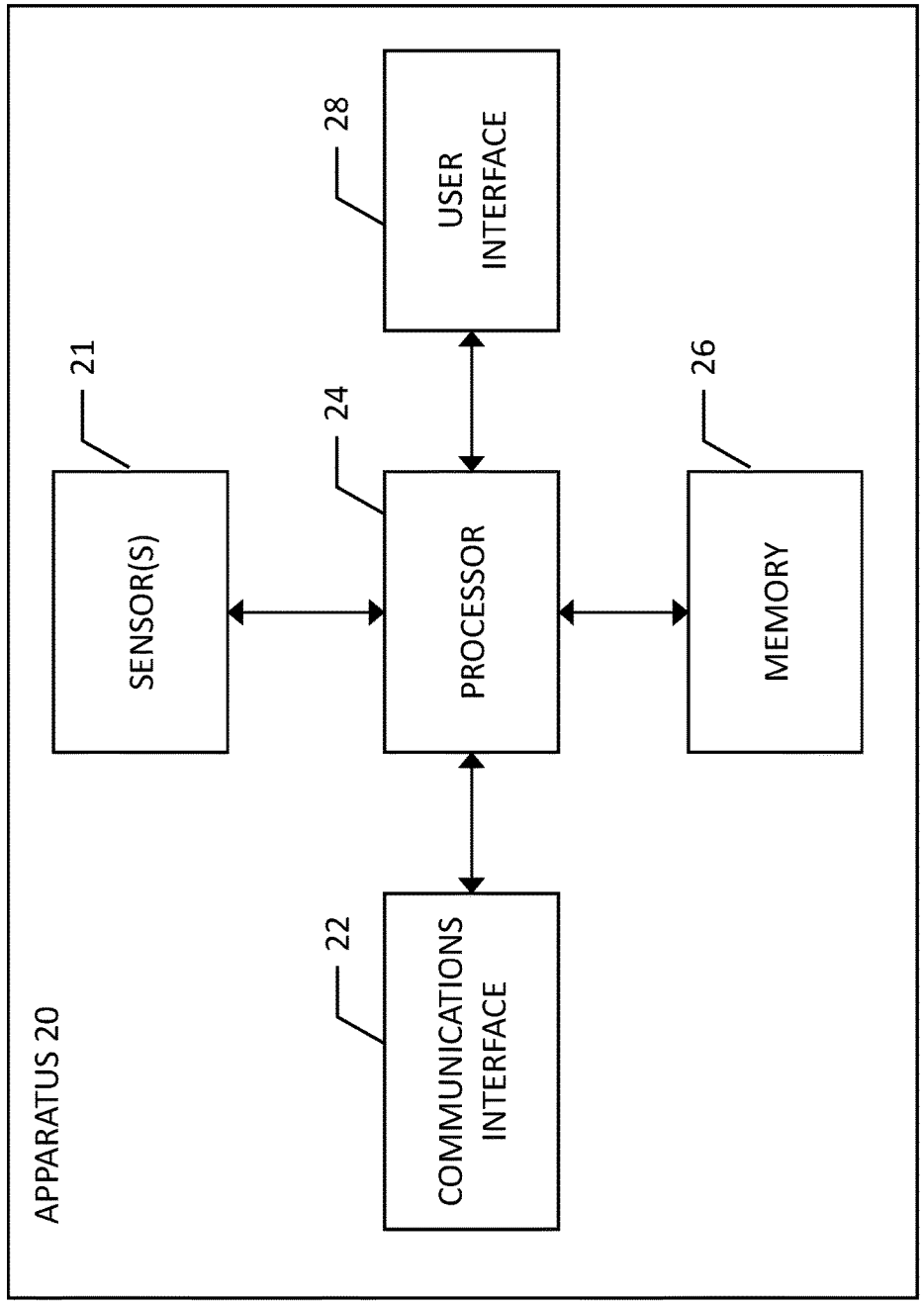
Figure 2:
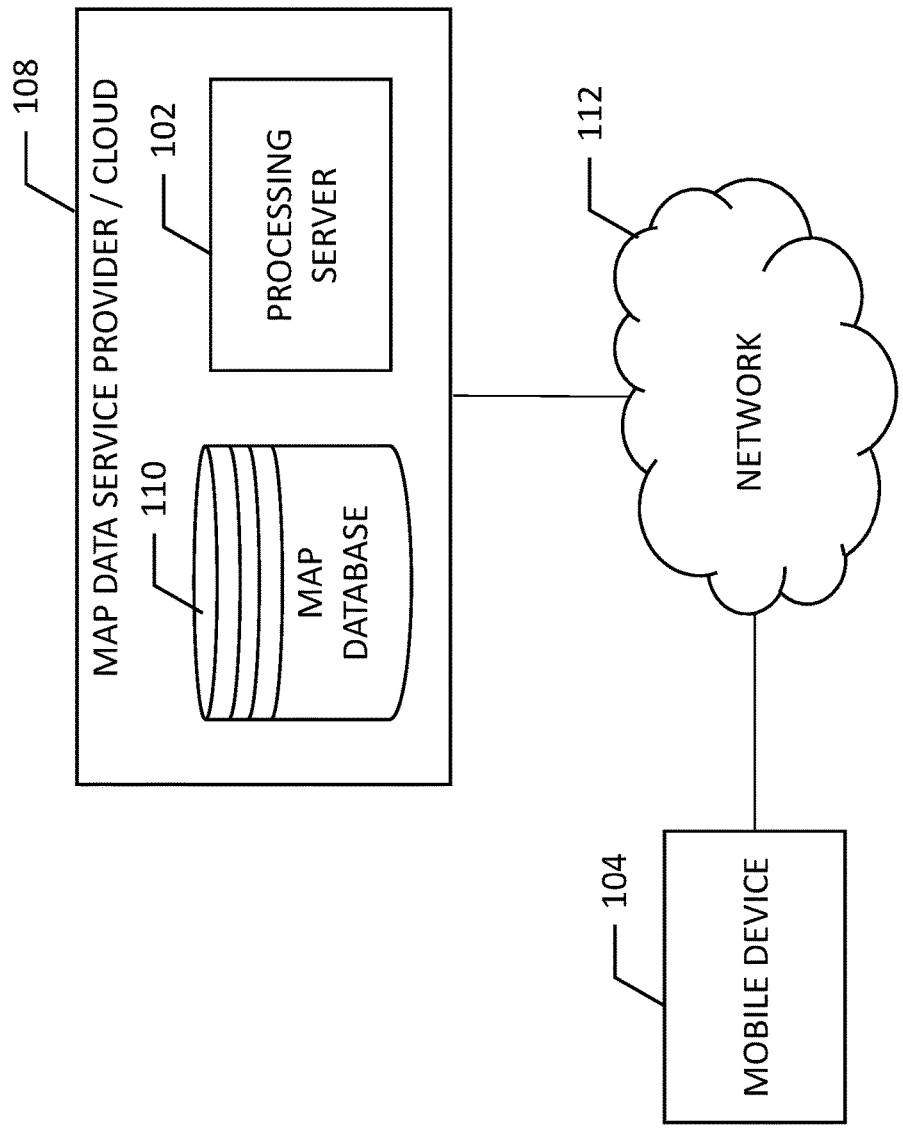
Figure 3:
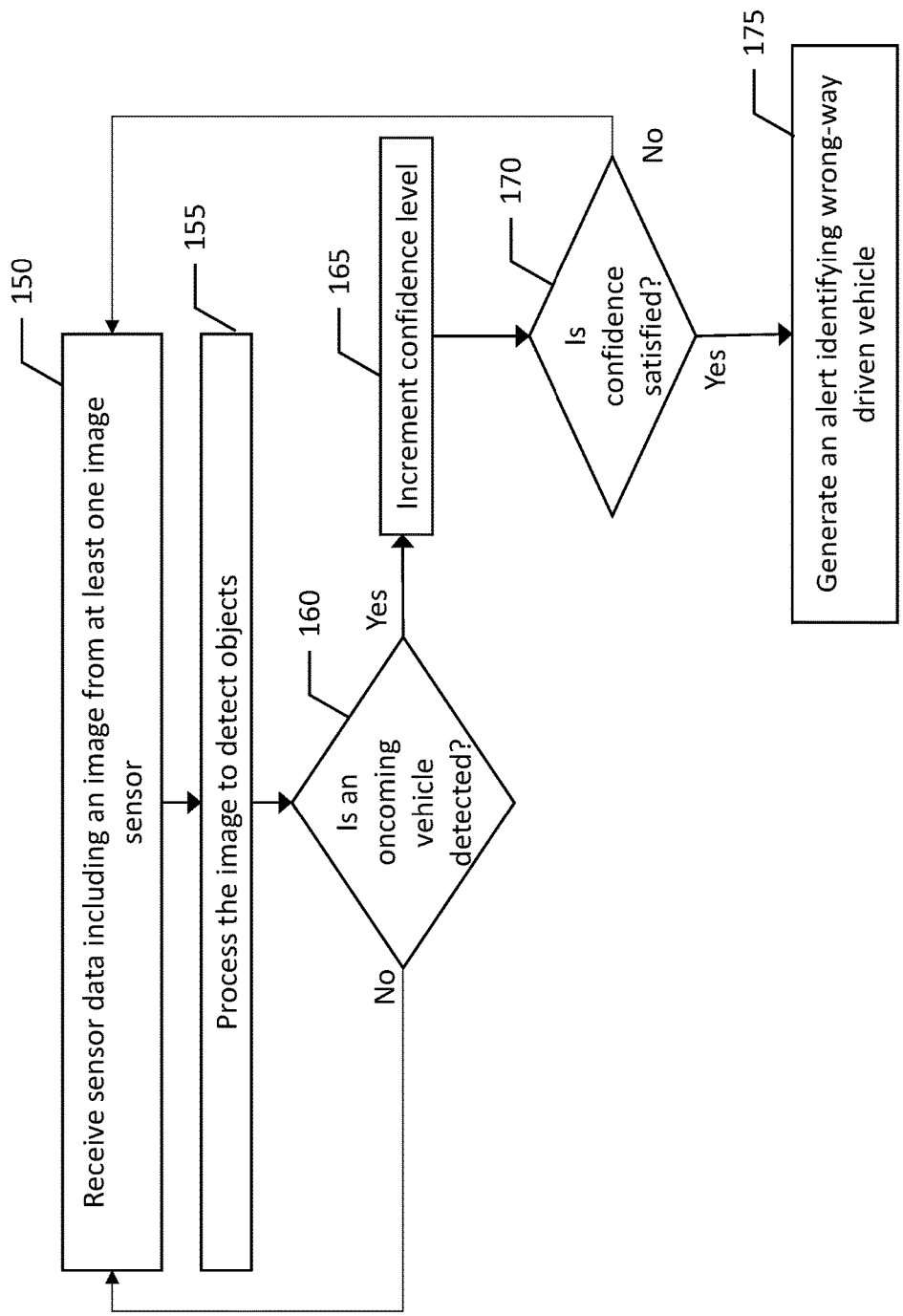
Figure 4:
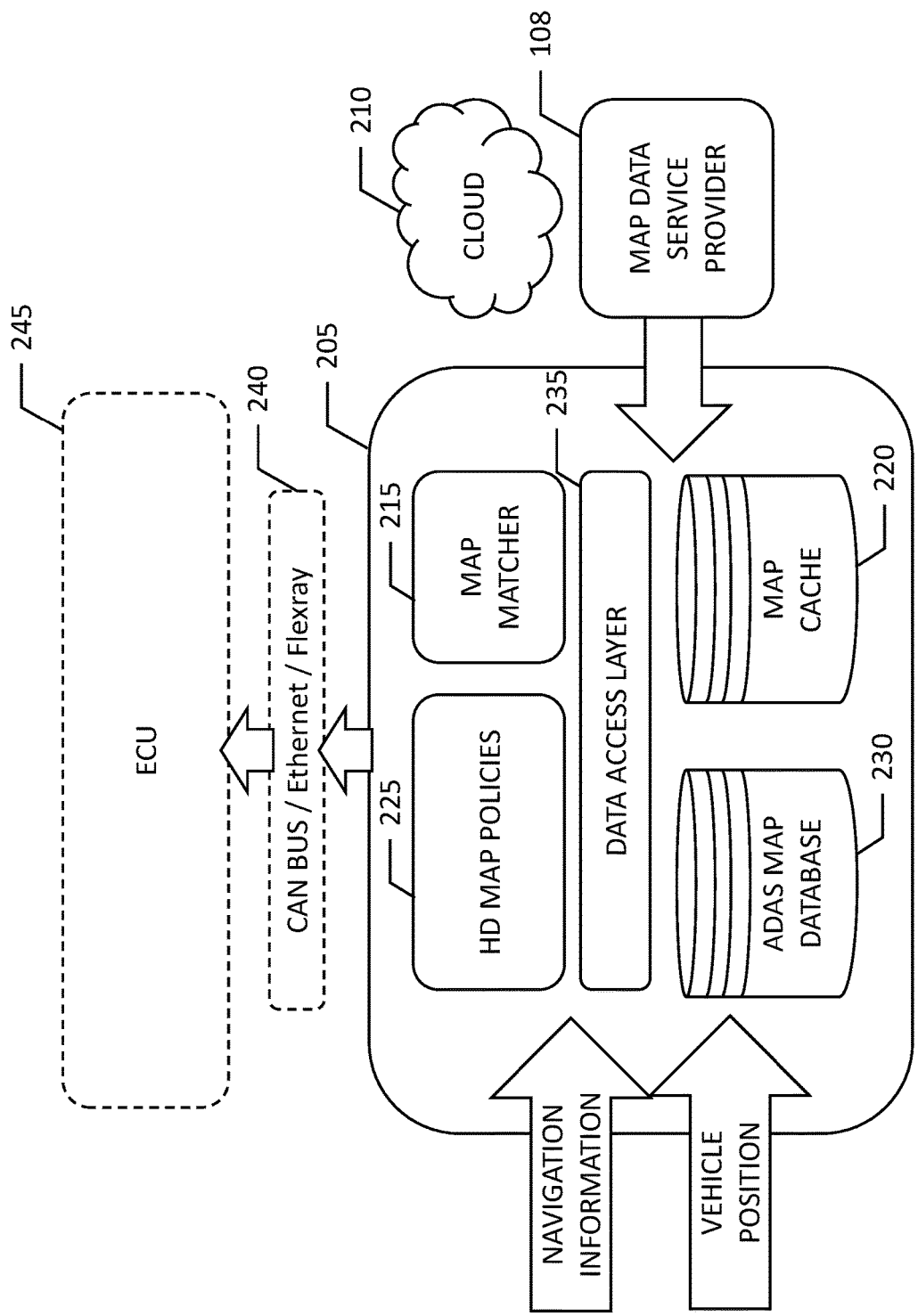
Figure 5:
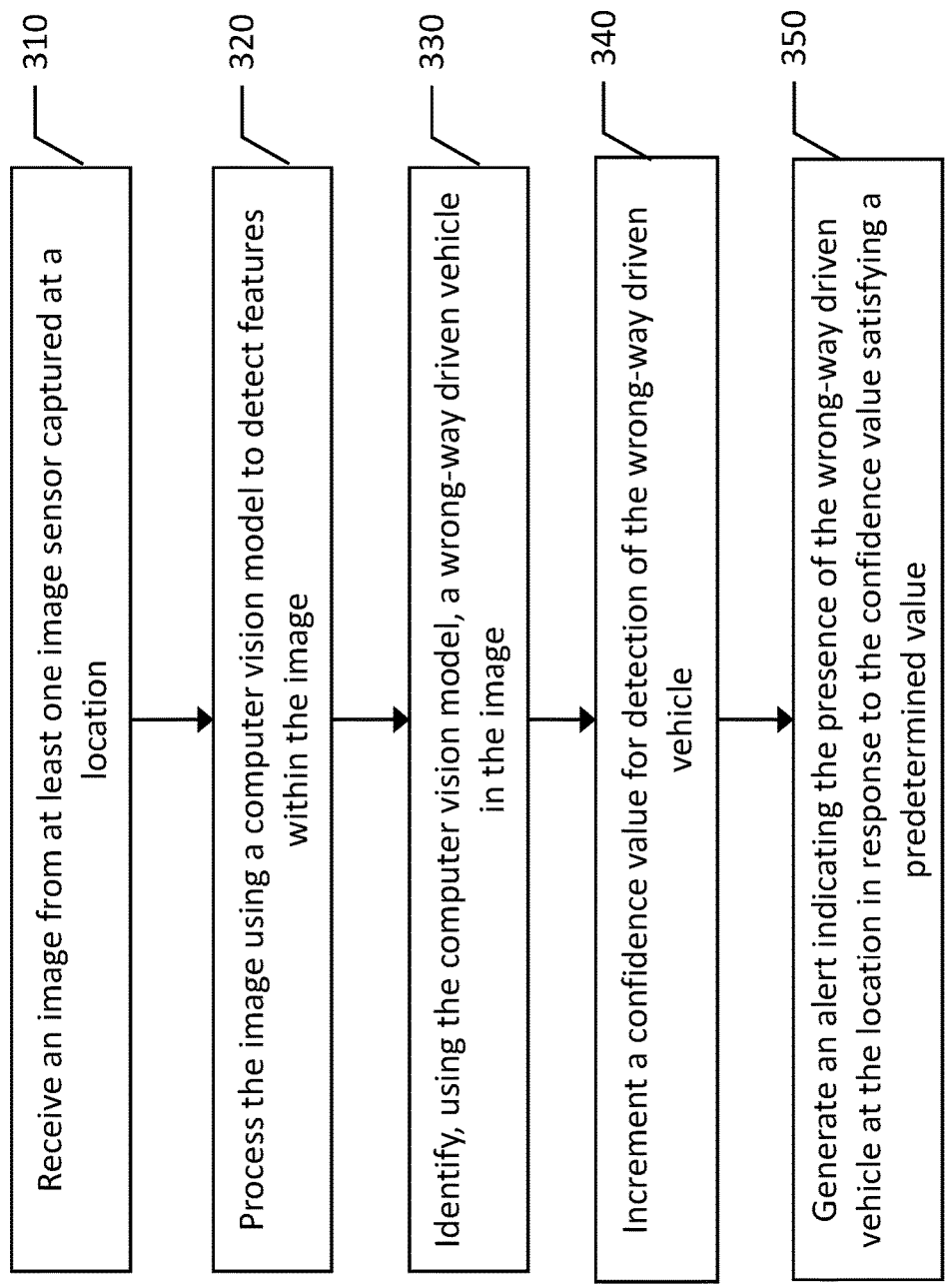

Having thus described certain example embodiments of the present invention in general terms, reference will hereinafter be made to the accompanying drawings which are not necessarily drawn to scale, and wherein:

FIG. 1 is a block diagram of an apparatus according to an example embodiment of the present disclosure;

FIG. 2 is a block diagram of a system for iteratively establishing the position of a detected object according to an example embodiment of the present disclosure;

FIG. 3 is a flowchart of a method for automatically identify wrong-way driven vehicles in real-time on a roadway according to an example embodiment of the present disclosure;

FIG. 4 is a block diagram of a system for implementing the methods described herein for automatically identify wrong-way driven vehicles in real-time on a roadway according to an example embodiment of the present disclosure; and FIG. 5 is a flowchart of operations for automatically identify wrong-way driven vehicles in real-time on a roadway according to an example embodiment of the present disclosure.

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

A method, apparatus and computer program product are provided in accordance with an example embodiment of the present invention for identifying wrong-way driven vehicles, and more particularly, to a method, apparatus, and computer program product to automatically identify wrong-way driven vehicles in real-time on a roadway. Vehicle safety features that protect occupants in the event of an accident are invaluable in protecting people. However, it is preferable to avoid the accident if at all possible. Embodiments described herein provide a method of identifying wrong-way driven vehicles in an effort to avoid an accident, and to alert other vehicles of the presence of a wrong-way driver to attempt to avoid accidents between other vehicles.

Drivers that are impaired and/or unfamiliar with their surroundings may unknowingly proceed the wrong-way down a road segment. Wrong-way driving may occur on one-way streets, such as in cities and towns, where road segment speed limits may be relatively low, such as below 40 miles per hour. These wrong-way driving events are dangerous and can lead to accidents, including severe accidents. However, wrong-way driving events on a relatively high-speed roadway such as a highway or interstate may lead to much more severe accidents including high speed collisions potentially involving numerous vehicles. In any wrong-way driving scenario, detection of the wrong-way driven vehicle and generating an alert can help avoid accidents.

Embodiments described herein employ sensors of a vehicle and analysis of captured sensor data to identify wrong-way driven vehicles. Once identified, an alert can be provided locally to a driver and/or occupant of the vehicle having the sensors, and the alert can be provided to other vehicles in the vicinity of the wrong-way driven vehicle to help avoid an accident. Further, an alert may be provided to authorities and emergency services of the wrong-way driven vehicle to respond. Authorities can use this information to close access to the road along which the wrong-way driven vehicle is driving (e.g., by traffic signals, gates, local authorities, or whatever resources may be available), and to pursue the wrong-way driven vehicle if appropriate. Emergency services can dispatch an ambulance in anticipation of a potential accident as deemed necessary. The level of response to the alert may be influenced, at least in part, by the time of day and/or level of traffic determined to be along the road segment where the wrong-way driven vehicle is being driven.

Embodiments described herein broadly relate to computer vision where a sensor capturing data such as image data of an environment of a vehicle can determine the presence of a vehicle that is being driven the wrong direction along a road segment. Embodiments analyze sensor data to determine and confirm the presence of a wrong-way driven vehicle before providing an alert as false-alerts pose a problem of reliability and diminish the value of an alert. Further, alerts can include information regarding the wrong-way driven vehicle. The information of an example embodiment may include a location of the wrong-way driven vehicle (e.g., a latitude and longitude, a road segment, a lane of a road segment, etc.), a speed of the wrong-way driven vehicle, and a description of the wrong-way driven vehicle (e.g., color, make, model, license plate, etc.).

FIG. 1 is a schematic diagram of an example apparatus configured for performing any of the operations described herein. Apparatus 20 is an example embodiment that may be embodied by or associated with any of a variety of computing devices, such as a mobile device, personal digital assistant (PDA), mobile telephone, smart phone, personal navigation device, smart watch, tablet computer, camera or any combination of the aforementioned and other types of voice and text communications systems. Embodiments may optionally include or are otherwise associated with a device configured for providing advanced driver assistance features which may include a navigation system user interface. For example, the computing device may be an Advanced Driver Assistance System module (ADAS) which may at least partially control autonomous or semi-autonomous features of a vehicle. In an embodiment where some level of vehicle autonomy is involved, the apparatus 20 is embodied or partially embodied by an electronic control unit of a vehicle that supports safety-critical systems such as the powertrain (engine, transmission, electric drive motors, etc.), steering (e.g., steering assist or steer-by-wire), and braking (e.g., brake assist or brake-by-wire). Optionally, the computing device may be a fixed computing device, such as a built-in vehicular navigation device, assisted driving device, or the like.

Optionally, the apparatus may be embodied by or associated with a plurality of computing devices that are in communication with or otherwise networked with one another such that the various functions performed by the apparatus may be divided between the plurality of computing devices that operate in collaboration with one another.

The apparatus 20 may be equipped or associated, e.g., in communication, with any number of sensors 21, such as a global positioning system (GPS), accelerometer, an image sensor, LiDAR, radar, and/or gyroscope. Any of the sensors may be used to sense information regarding the movement, positioning, or orientation of the device for use in navigation assistance, as described herein according to example embodiments. In some example embodiments, such sensors may be implemented in a vehicle or other remote apparatus, and the information detected may be transmitted to the apparatus 20, such as by near field communication (NFC) including, but not limited to, Bluetooth™ communication, or the like.

The apparatus 20 may include, be associated with, or may otherwise be in communication with a communication interface 22, a processor 24, a memory device 26 and a user interface 28. In some embodiments, the processor (and/or co-processors or any other processing circuitry assisting or otherwise associated with the processor) may be in communication with the memory device via a bus for passing information among components of the apparatus. The memory device may be non-transitory and may include, for example, one or more volatile and/or non-volatile memories. In other words, for example, the memory device may be an electronic storage device (for example, a computer readable storage medium) comprising gates configured to store data (for example, bits) that may be retrievable by a machine (for example, a computing device like the processor). The memory device may be configured to store information, data, content, applications, instructions, or the like for enabling the apparatus to carry out various functions in accordance with an example embodiment of the present invention. For example, the memory device could be configured to buffer input data for processing by the processor. Additionally or alternatively, the memory device could be configured to store instructions for execution by the processor.

The processor 24 may be embodied in a number of different ways. For example, the processor may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an example embodiment, the processor 24 may be configured to execute instructions stored in the memory device 26 or otherwise accessible to the processor. Alternatively or additionally, the processor may be configured to execute hard coded functionality. As such, whether configured by hardware or software methods, or by a combination thereof, the processor may represent an entity (for example, physically embodied in circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor of a specific device (for example, the computing device) configured to employ an embodiment of the present invention by further configuration of the processor by instructions for performing the algorithms and/or operations described herein. The processor may include, among other things, a clock, an arithmetic logic unit (ALU) and logic gates configured to support operation of the processor.

The apparatus 20 of an example embodiment may also include or otherwise be in communication with a user interface 28. The user interface may include a touch screen display, a speaker, physical buttons, and/or other input/output mechanisms. In an example embodiment, the processor 24 may comprise user interface circuitry configured to control at least some functions of one or more input/output mechanisms. The processor and/or user interface circuitry comprising the processor may be configured to control one or more functions of one or more input/output mechanisms through computer program instructions (for example, software and/or firmware) stored on a memory accessible to the processor (for example, memory device 24, and/or the like).

The apparatus 20 of an example embodiment may also optionally include a communication interface 22 that may be any means such as a device or circuitry embodied in either hardware or a combination of hardware and software that is configured to receive and/or transmit data from/to other electronic devices in communication with the apparatus, such as by NFC, described above. Additionally or alternatively, the communication interface 22 may be configured to communicate over Global System for Mobile Communications (GSM), such as but not limited to Long Term Evolution (LTE). In this regard, the communication interface 22 may include, for example, an antenna (or multiple antennas) and supporting hardware and/or software for enabling communications with a wireless communication network. Additionally or alternatively, the communication interface 22 may include the circuitry for interacting with the antenna(s) to cause transmission of signals via the antenna(s) or to handle receipt of signals received via the antenna(s). In some environments, the communication interface 22 may alternatively or also support wired communication and/or may alternatively support vehicle to vehicle or vehicle to infrastructure wireless links.

The apparatus 20 may support a mapping or navigation application so as to present maps or otherwise provide navigation or driver assistance. For example, the apparatus 20 may provide for display of a map and/or instructions for following a route within a network of roads via user interface 28. In order to support a mapping application, the computing device may include or otherwise be in communication with a geographic database, such as may be stored in memory 26. For example, the geographic database includes node data records, road segment or link data records, point of interest (POI) data records, and other data records. More, fewer, or different data records can be provided. In one embodiment, the other data records include cartographic data records, routing data, and maneuver data. One or more portions, components, areas, layers, features, text, and/or symbols of the POI or event data can be stored in, linked to, and/or associated with one or more of these data records. For example, one or more portions of the POI, event data, or recorded route information can be matched with respective map or geographic records via position or GPS data associations (such as using known or future map matching or geo-coding techniques), for example. Furthermore, other positioning technology may be used, such as electronic horizon sensors, radar, LiDAR, ultrasonic and/or infrared sensors.

In example embodiments, a navigation system user interface may be provided to provide driver assistance to a user traveling along a network of roadways. Optionally, embodiments described herein may provide assistance for autonomous or semi-autonomous vehicle control. Autonomous vehicle control may include driverless vehicle capability where all vehicle functions are provided by software and hardware to safely drive the vehicle along a path identified by the vehicle. Semi-autonomous vehicle control may be any level of driver assistance from adaptive cruise control, to lane-keep assist, or the like. Identifying objects along road segments or road links that a vehicle may traverse may provide information useful to navigation and autonomous or semi-autonomous vehicle control by establishing barriers defining roadway width, identifying roadway curvature, or any boundary related details of the road links that may be traversed by the vehicle.

A map service provider database may be used to provide driver assistance via a navigation system and/or through an ADAS having autonomous or semi-autonomous vehicle control features. FIG. 2 illustrates a communication diagram of an example embodiment of a system for implementing example embodiments described herein. The illustrated embodiment of FIG. 2 includes a mobile device 104, which may be, for example, the apparatus 20 of FIG. 2, such as a mobile phone, an in-vehicle navigation system, an ADAS, or the like, and a map data service provider 108 or cloud service. Each of the mobile device 104 and map data service provider 108 may be in communication with at least one of the other elements illustrated in FIG. 2 via a network 112, which may be any form of wireless or partially wireless network as will be described further below. Additional, different, or fewer components may be provided. For example, many mobile devices 104 may connect with the network 112. The map data service provider 108 may be cloud-based services and/or may operate via a hosting server that receives, processes, and provides data to other elements of the system.

The map data service provider may include a map database 110 that may include node data, road segment data or link data, point of interest (POI) data, traffic data or the like. The map database 110 may also include cartographic data, routing data, and/or maneuvering data. According to some example embodiments, the road segment data records may be links or segments representing roads, streets, or paths, as may be used in calculating a route or recorded route information for determination of one or more personalized routes. The node data may be end points corresponding to the respective links or segments of road segment data. The road link data and the node data may represent a road network, such as used by vehicles, cars, trucks, buses, motorcycles, and/or other entities. Optionally, the map database 110 may contain path segment and node data records or other data that may represent pedestrian paths or areas in addition to or instead of the vehicle road record data, for example. The road/link segments and nodes can be associated with attributes, such as geographic coordinates, street names, address ranges, speed limits, turn restrictions at intersections, and other navigation related attributes, as well as POIs, such as fueling stations, hotels, restaurants, museums, stadiums, offices, auto repair shops, buildings, stores, parks, etc. The map database 110 can include data about the POIs and their respective locations in the POI records. The map database 110 may include data about places, such as cities, towns, or other communities, and other geographic features such as bodies of water, mountain ranges, etc. Such place or feature data can be part of the POI data or can be associated with POIs or POI data records (such as a data point used for displaying or representing a position of a city). In addition, the map database 110 can include event data (e.g., traffic incidents, construction activities, scheduled events, unscheduled events, etc.) associated with the POI data records or other records of the map database 110.

The map database 110 may be maintained by a content provider e.g., the map data service provider and may be accessed, for example, by the content or service provider processing server 102. By way of example, the map data service provider can collect geographic data and dynamic data to generate and enhance the map database 110 and dynamic data such as traffic-related data contained therein. There can be different ways used by the map developer to collect data. These ways can include obtaining data from other sources, such as municipalities or respective geographic authorities, such as via global information system databases. In addition, the map developer can employ field personnel to travel by vehicle along roads throughout the geographic region to observe features and/or record information about them, for example. Also, remote sensing, such as aerial or satellite photography and/or LiDAR, can be used to generate map geometries directly or through machine learning as described herein. However, the most ubiquitous form of data that may be available is vehicle data provided by vehicles, such as mobile device 104, as they travel the roads throughout a region.

The map database 110 may be a master map database, such as an HD map database, stored in a format that facilitates updates, maintenance, and development. For example, the master map database or data in the master map database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data may be compiled (such as into a platform specification format (PSF) format) to organize and/or configure the data for performing navigation-related functions and/or services, such as route calculation, route guidance, map display, speed calculation, distance and travel time functions, and other functions, by a navigation device, such as by a vehicle represented by mobile device 104, for example. The navigation-related functions can correspond to vehicle navigation, pedestrian navigation, or other types of navigation. The compilation to produce the end user databases can be performed by a party or entity separate from the map developer. For example, a customer of the map developer, such as a navigation device developer or other end user device developer, can perform compilation on a received map database in a delivery format to produce one or more compiled navigation databases.

As mentioned above, the map data service provider 108 map database 110 may be a master geographic database, but in alternate or complementary embodiments, a client side map database may represent a compiled navigation database that may be used in or with end user devices (e.g., mobile device 104) to provide navigation and/or map-related functions. For example, the map database 110 may be used with the mobile device 104 to provide an end user with navigation features. In such a case, the map database 110 can be downloaded or stored on the end user device which can access the map database 110 through a wireless or wired connection, such as via a processing server 102 and/or the network 112, for example.

In one embodiment, as noted above, the end user device or mobile device 104 can be embodied by the apparatus 20 of FIG. 1 and can include an Advanced Driver Assistance System (ADAS) which may include an infotainment in-vehicle system or an in-vehicle navigation system, and/or devices such as a personal navigation device (PND), a portable navigation device, a cellular telephone, a smart phone, a personal digital assistant (PDA), a watch, a camera, a computer, and/or other device that can perform navigation-related functions, such as digital routing and map display. An end user can use the mobile device 104 for navigation and map functions such as guidance and map display, for example, and for determination of useful driver assistance information, according to some example embodiments.

As outlined above, vehicle safety is a focus of advancements in technology for vehicles and for mobile devices that may be embodied within the vehicle or otherwise carried by a user. While improvements to vehicle structures have been developed to mitigate the effects of an impact during an accident, safety features are increasingly focused on avoiding accidents altogether. Described herein is a method, apparatus, and computer program product to further help avoid accidents through the automatic identification of wrong-way driven vehicles, and to provide an alert regarding the wrong-way driven vehicle.

Embodiments described herein use sensor data to identify a wrong-way driven vehicle. The sensors may include, for example, image sensors capturing images of vehicles on a roadway. The sensor data is processed and through a computer vision model (e.g., a convolutional neural network) to detect a vehicle being driven the wrong direction on the roadway. The presence of a vehicle being driven the wrong direction is confirmed before an alert is generated. The alert may be provided to a driver/occupant of a vehicle from which the wrong-way driven vehicle was detected, and to other drivers/occupants within a predefined area. Further, in the case of autonomous or semi-autonomous vehicles, the alert may be provided to such vehicles so that they can take any necessary action or countermeasures. For example, an autonomous vehicle that detects a wrong-way driven vehicle may activate headlights, high-beam headlights, hazard flashing lights, vehicle horn, or the like to alert a wrong-way driven vehicle. Further, an autonomous or semi-autonomous vehicle may apply pre-tension to seatbelts, slow the vehicle speed, and possible move to a shoulder or off of a road on which a wrong-way driven vehicle has been detected. These precautionary measures can help avoid an accident.

A wrong-way driven vehicle may be detected by an apparatus such as mobile device 104 of FIG. 2. According to example embodiments described herein, the apparatus used to detect wrong-way driven vehicles includes at least one sensor (e.g., sensor 21 of the apparatus 20 of FIG. 1).

Further, the apparatus includes at least one processor (e.g., processor 24) to process the sensor data received from the at least one sensor. The apparatus can be, for example, an autonomous vehicle where the sensor includes an image sensor or other sensor used to detect objects around the vehicle, such as objects in front of the vehicle or, as detailed further below, alongside of the vehicle. The apparatus could optionally include a mobile device such as a cellular phone having a camera where the cellular phone is mounted or held in such a way as to have a view of the road ahead of a vehicle.

Sensor data from a sensor as described herein is continually processed and parsed to detect objects in the sensor data. For example, in sensor data from an image sensor, the images are parsed to detect objects in the images such as lane lines of a road, vehicles, road boundaries, and signs. These images may also be used to identify wrong-way driven vehicles. To automatically detect a wrong-way driven vehicle, the images are processed to detect a front of a vehicle in the direction of travel. The images may be processed, for example, using a computer vision model such as a convolutional neural network trained on images in order to detect the front side of a vehicle. Training data can be established based on a variety of sources. Images of the front-side of vehicles can be obtained for every vehicle sold to help the computer vision model understand the universe of vehicle front-sides. Optionally, images may be generated from crowd-sourced image gathering with the front-side of vehicles manually labeled to generate training data. The front-sides of most vehicles share some common features as most include visible headlights in standard locations and heights from the ground, while many include grilles or other distinguishing features. This information is useful for a computer vision model to help definitively establish the presence of the front of a vehicle in an image.

As a vehicle travels along a road segment and image data is captured, the computer vision model may identify a wrong-way driven vehicle. Depending upon the road (e.g., road functional class) along which the vehicle is traveling, wrong-way vehicle detection may have different functions. For example, along a two-lane road with one lane for each of two opposing directions, wrong-way driven vehicle detection may only be important for detecting a vehicle driven in the opposing direction of a specific lane. Thus, the front-side of vehicles may be regularly detected in images of the two-lane road which would be normal provided they are in their appropriate lane of travel. The type of road segment along which a vehicle is traveling may be established, for example, by the map database described above, where a location of a vehicle can be map-matched to a road segment, and the map database information pertaining to the map-matched road segment identifies the type of road, the number of lanes, and the direction of the lanes. This information can be used to determine how the wrong-way driven vehicle detection is implemented.

Referring again to the case of a two-lane road with one lane of travel in each direction of the road, wrong-way driven vehicle detection may not only involve detecting the front-side of a vehicle, but identifying which lane the vehicle is in. If the vehicle is in the opposing lane, then it is determined to be traveling in the appropriate direction. If the vehicle is in the wrong lane, a wrong-way driven vehicle may be identified. This scenario may occur when an oncoming vehicle is passing a slower vehicle in the opposite lane such that not all wrong-way driven vehicles are driving improperly. However, based on a proximity of the wrong-way driven vehicle, an alert may be generated through detection of the wrong-way driven vehicle and actions taken as further described below.

A more serious scenario of wrong-way driven vehicles occurs on limited-access highways where vehicles travel at high speeds and wrong-way drivers may not be aware of their error. In this scenario, detection of the wrong-way driven vehicle may occur in any lane traveling in the same direction as the sensing vehicle. Further, a lane in which a wrong-way driven vehicle is detected may be identified and communicated as part of the alert.

FIG. 3 illustrates the process of determining the presence of a wrong-way driven vehicle along a road segment. As shown, sensor data is received at 150 including an image from at least one image sensor. The image is processed to detect objects at 155. Objects can include road features (e.g., road markings, signs, road barriers, etc.), vehicles, pedestrians, etc. The computer vision model trained on detecting the front-side of vehicles is used to process the image to identify any potential wrong-way driven vehicles. At 160 it is determined if an oncoming vehicle (i.e., a wrong-way driven vehicle) is detected. If not, the sensor continues collecting sensor data as normal. If an oncoming vehicle is detected, a confidence is incremented at 165. The detection of an oncoming vehicle in one image may not be sufficient to positively identify a wrong-way driven vehicle. The confidence level is checked at 170, and if the confidence is not sufficiently high, image sensor data is again collected at 150. Once the confidence is satisfied, such as if the oncoming vehicle is detected in two or three consecutive images, an alert identifying the wrong-way driven vehicle is generated at 175.

The confidence of detection of a wrong-way driven vehicle is important to avoid false-positive alerts which can lead to minimization of alerts due to a frequency of erroneous alerts. Embodiments employ a confidence that is incremented with subsequent detection of an oncoming vehicle. For example, when an oncoming vehicle is detected at 160 for the first time, a confidence level may be incremented, such as to 33%. A confidence of 33% is not sufficient to provide a wrong-way driven vehicle alert, such that the confidence is not satisfied, and sensor data continues to be collected as shown at 150. If there is a second detection of an oncoming vehicle within a predetermined amount of time (such as within two seconds), the confidence level can again be incremented, such as to 66%. This confidence level may still be insufficient to generate an alert of a wrong-way driven vehicle such that data continues to collect and be processed. A third detection of an oncoming vehicle within a predetermined amount of time (e.g., within a predefined amount of time of the first detection and/or the second detection) causes the confidence level to increment again to 100%. At this confidence, the confidence level is satisfied at 170 and an alert is generated identifying the wrong-way driven vehicle.

The image capture rate and processing needs to be relatively fast to detect and generate an alert for a wrong-way driven vehicle. As such, the image capture and processing may capture and process images at more than one image per second. During detection, if an oncoming vehicle is detected at 160, and subsequent images fail to include an object identified as an oncoming vehicle for a period of time, such as for three seconds, the confidence level may be reset as it is determined that there is no wrong-way driven vehicle.

The computer vision model for detecting an oncoming vehicle to be identified as a wrong-way driven vehicle may require the object identified as the oncoming vehicle to increase in observed size between subsequent images in order to classify the object as an oncoming vehicle. A vehicle that is being towed or carried by another vehicle may be facing backwards as it travels down a road segment ahead of a sensing vehicle. The front-side of such a vehicle may be initially identified as a wrong-way driven vehicle; however, subsequent images of the front-side of the vehicle may reveal that it is not approaching at a fast enough speed to be an oncoming vehicle. For example, if the sensing vehicle is traveling at a speed of 55 miles-per-hour (mph), an oncoming vehicle would need to be traveling at a speed relative to the sensing vehicle faster than that. If the detected front-side of a vehicle is traveling at less than 55 mph (e.g., 15 mph), the sensing vehicle may be approaching a towed vehicle.

The location of a vehicle detecting a wrong-way driven vehicle can be important for a number of reasons. The location can be used to identify where the wrong-way driven vehicle is located, which direction it is headed, and what road segment the wrong-way driven vehicle is proceeding on. Further, the location of the sensing vehicle that detects the wrong-way driven vehicle may be important to identify the severity of a wrong-way driven vehicle and to determine confidence in the wrong-way driven vehicle presence. For example, a sensing vehicle that is traveling along a road segment may have a location associated therewith (e.g., through GPS or other locating means). This location may be map-matched to a road segment to understand the context of the sensing vehicle. Computer vision may assist in identifying a road segment along which the sensing vehicle is traveling. For instance, if a vehicle is traveling on a two-lane service road adjacent to a multi-lane highway, detecting the front-side of a vehicle may be expected provided it is one lane over. However, if the vehicle is on the multi-lane divided highway, the detection of a front-side of a vehicle is not expected in any adjacent lanes. The location including the map-matched location and properties of the road segment of the map-matched location may be established based on the map data, such as from map database 110.

Once a wrong-way driven vehicle is detected with a confidence satisfying the confidence at 170 of the flowchart of FIG. 3, an alert regarding the wrong-way driven vehicle can be generated and disseminated. An alert can be provided locally to a driver or occupant of the sensing vehicle from which the wrong-way driven vehicle was detected. For example, a warning may be provided on a display (e.g., a user interface) such as the display of a mobile device or the display of a vehicle infotainment/navigation system. This alert may provide a driver information such that they can take evasive action with respect to the wrong-way driven vehicle. When the sensing vehicle has at least some autonomous control (e.g., semi-autonomous or fully autonomous), the alert may be provided to the vehicle such that evasive action is taken by the vehicle automatically. Actions that can be taken by a vehicle include application of brakes to slow the vehicle, steering of the vehicle off of the roadway, pre-tensioning seatbelts, activation of stability control (if not already activated in order to facilitate evasive actions), the activation of headlights/high-beams/hazard lights, or other actions to help avoid an accident or prepare for a potential accident.

While the alert may be provided to and used by the sensing vehicle, alerts may also be provided to vehicles within a predefined distance of the detected wrong-way driven vehicle. Such an alert may be provided to vehicles within a predetermined radius of the sensing vehicle, or more targeted to vehicles on the road that are likely to encounter the wrong-way driven vehicle. A location associated with the wrong-way driven vehicle may also be provided that alerts the other vehicles to the location of the wrong-way driven vehicle. Further, vehicles receiving the alerts may take action similar to those of the sensing vehicle if the wrong-way driven vehicle is identified to be at a location close to a respective vehicle.

In addition to providing an alert to other vehicles within an area, an alert may be provided to service providers, such as law enforcement, emergency responders (e.g., paramedics), and a transportation department, for example. Each of these service providers may be able to act responsive to the alert. For example, law enforcement may be dispatched to the location of the detected wrong-way driven vehicle for multiple purposes. Those purposes can include shutting down access to the road on which the wrong-way driven vehicle is detected, clearing traffic ahead of the wrong-way driven vehicle, pursuing or apprehending the wrong-way driven vehicle, or responding to one or more accidents caused by the wrong-way driven vehicle. Emergency responders can be alerted of the wrong-way driven vehicle and can proceed to the location where the wrong-way driven vehicle is or will be in anticipation of a potential accident. A transportation department may be alerted such that they can close roads, access points, or otherwise limit traffic (e.g., by triggering relevant traffic lights to advance or stop traffic) on the road segment where the wrong-way driven vehicle was detected. Further, a transportation department can update dynamic signs with warnings to other drivers regarding a wrong-way driven vehicle.

The dangers associated with a wrong-way driven vehicle are high such that detection of such a vehicle can cause a sensing vehicle to dedicate more resources to confirming the presence of a wrong-way driven vehicle. Sensors of an autonomous or semi-autonomous vehicle may have one or more degrees of freedom or may be configured to direct the focus of the sensors to specific areas. When a computer vision model as described herein processes the sensor data and detects an oncoming, wrong-way driven vehicle, the sensors of the vehicle may focus their attention on the detected wrong-way driven vehicle. For example, sensors that have the ability to pivot and/or rotate may lock on to the wrong-way driven vehicle and focus the sensor on that vehicle such that the computer vision model can continue to capture sensor data relating to the vehicle, and to confirm the presence (or absence) of a wrong-way driven vehicle to provide alerts and information associated with the wrong-way driven vehicle. This sensor lock can maintain focus on the wrong-way driven vehicle until the wrong-way driven vehicle is past the sensing vehicle or otherwise no longer a threat to the sensing vehicle. Once the threat is gone, the sensors can return to their normal state.

Beyond sensor dedication to a detected wrong-way driven vehicle, processing capacity may also be dedicated to a detected wrong-way driven vehicle. In this manner, when a wrong-way driven vehicle is first detected, sensors may focus their attention on the detected wrong-way driven vehicle, and in some instances, sensor refresh rate may increase to capture more sensor data and greater detail. Processing capacity may be allocated to these sensors to process the increase in data and to ensure wrong-way driven vehicle detection is prioritized and maintained in substantially real-time.

The above-described example embodiment relates generally to the detection of wrong-way driven vehicles based on the detection of a front-side of the vehicle; however, embodiments described herein can use sensor data to identify wrong-way driven vehicles traveling in the same direction as the sensing vehicle. For example, on a divided highway, a sensing vehicle may detect a vehicle traveling in opposing-direction lanes that is driving in the same direction as the sensing vehicle. This may be performed by sensors capturing data from a side of the sensing vehicle (and side-forward, side-backward). The detection of a vehicle traveling in the wrong direction on a road segment that is different, or at least a different direction from the sensing vehicle, may not be a direct threat to the sensing vehicle; however, alerts may still be provided to other vehicles potentially impacted by the wrong-way driven vehicle, to emergency services, law enforcement, and a transportation department as described above. A computer vision model for detecting such vehicles may be trained on images of vehicle profiles to detect a heading of a vehicle, and the sensing vehicle may optionally use their own heading as reference when traveling alongside a vehicle traveling in a wrong direction on a road segment.

FIG. 4 illustrates an example embodiment of architecture specifically configured for implementing embodiments described herein. The illustrated embodiment of FIG. 4 may be vehicle-based, where sensor data is obtained from sensors of a vehicle traveling along a road segment. The location of the collected sensor data along the road segment may be determined through location determination using Global Navigation Satellite System (GNSS) like the global positioning system (GPS) Galileo, etc., cellular tower location methods, access point communication fingerprinting, or the like and correlated to map data of map data service provider 108. As illustrated, the architecture includes a map data service provider 108 that provides map data (e.g., HD maps and policies associated with road links within the map) to the Advanced Driver Assistance System (ADAS) 205, which may be vehicle-based or server based depending upon the application. The map data service provider may be a cloud-based 210 service. The ADAS 205 receives navigation information and vehicle position and may use that information to map-matcher 215 the position to a road link on a map of the mapped network of roads stored in the map cache 220. This link or segment, along with the direction of travel, may be used to establish which HD map policies 225 are applicable to the vehicle associated with the ADAS 205, including sensor capability information, autonomous functionality information, etc. Accordingly, policies for the vehicle are established based on the current location and the environmental conditions (e.g., traffic, time of day, weather). The HD map policies 225 associated with the road segment specific to the vehicle are provided to the vehicle control, such as via the CAN (computer area network) BUS (or Ethernet or Flexray) 240 to the electronic control unit (ECU) 245 of the vehicle to implement HD map policies 225, such as various forms of autonomous or assisted driving, or navigation assistance. As shown in FIG. 4, the ADAS 205 includes a data access layer 235 and an ADAS map database 230.

A vehicle traveling along a road segment may receive sensor data from a plurality of sensors used to capture data relating to the surrounding environment, such as the position of an object (e.g., a wrong-way driven vehicle) relative to a vehicle and the road segment. A vehicle with autonomous or semi-autonomous control may detect features in the environment, such as road features or information contained on a sign, to facilitate the autonomous or semi-autonomous control. Sensor redundancy may be used to provide additional confirmation relating to features and objects of the environment and to improve detection and reliability of vehicle interpretation of the surrounding environment. Sensor redundancy may be of particular benefit for detecting wrong-way driven vehicles, as sensor redundancy can provide improved confidence of detection and offer potentially faster confirmation of a wrong-way driven vehicle.

FIGS. 3 and 5 illustrate flowcharts depicting methods according to an example embodiment of the present invention. It will be understood that each block of the flowcharts and combination of blocks in the flowcharts may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by a memory device 26 of an apparatus employing an embodiment of the present invention and executed by a processor 24 of the apparatus 20. As will be appreciated, any such computer program instructions may be loaded onto a computer or other programmable apparatus (for example, hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowcharts support combinations of means for performing the specified functions and combinations of operations for performing the specified functions for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

FIG. 5 is a flowchart of a method for automatically identify wrong-way driven vehicles in real-time on a roadway. As shown at 310, an image is received from at least one image sensor captured at a location. The location may be raw location such as latitude and longitude, or the location may be a map-matched position along a road segment, for example. The image is processed at 320 using a computer vision model to detect features and objects within the image. Using the computer vision model at 330, a wrong-way driven vehicle is identified in the image. A confidence value for detection of the wrong-way driven vehicle is incremented at 340 such that a wrong-way driven vehicle is not identified only from a single image. An alert is generated at 350 indicating the presence of the wrong-way driven vehicle at the location in response to the confidence value satisfying a predetermined value.

In an example embodiment, an apparatus for performing the method of FIGS. 3 and/or 5 above may comprise a processor (e.g., the processor 24) configured to perform some or each of the operations (150-175 and/or 310-350) described above. The processor may, for example, be configured to perform the operations (150-175 and/or 310-350) by performing hardware implemented logical functions, executing stored instructions, or executing algorithms for performing each of the operations. Alternatively, the apparatus may comprise means for performing each of the operations described above. In this regard, according to an example embodiment, examples of means for performing operations 150-175 and/or 310-350 may comprise, for example, the processor 24 and/or a device or circuit for executing instructions or executing an algorithm for processing information as described above.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. An apparatus comprising at least one processor and at least one non-transitory memory including computer program code instructions, the computer program code instructions configured to, when executed, cause the apparatus to at least:
   receive an image from at least one image sensor captured at a location of a vehicle;
   determine (i) a type of road, (ii) a number of lanes, and (iii) a direction of travel of a road segment based on matching the location of the vehicle to a digital map;
   process the image using a computer vision model to detect features within the image;
   identify, based on features detected using the computer vision model, a wrong-way driven vehicle in the image;
   increment a confidence value for detection of the wrong-way driven vehicle based on (i) the type of road, (ii) the number of lanes, and (iii) the direction of travel of the road segment;
   generate an alert indicating the presence of the wrong-way driven vehicle at the location in response to the confidence value satisfying a predetermined value; and
   generate a control signal for activation of vehicle brakes and vehicle steering of the vehicle based on (i) the type of road, (ii) the number of lanes, and (iii) the direction of travel of the road segment in order to avoid a collision between the vehicle and the wrong-way driven vehicle.

2. The apparatus of claim 1, wherein the computer vision model is trained based on a plurality of images to detect a front-side of a given vehicle.

3. The apparatus of claim 1, wherein the apparatus is further caused to:
   control a rotational movement of the at least one image sensor based on a movement of the wrong-way driven vehicle in response to the apparatus identifying the wrong-way driven vehicle in the image.

4. The apparatus of claim 1, wherein the apparatus is further caused to:
   allocate additional processing capacity to the at least one image sensor in response to the apparatus identifying the wrong-way driven vehicle in the image.

5. The apparatus of claim 4, wherein causing the apparatus to allocate additional processing capacity to the at least one image sensor further comprises causing the apparatus to increase an image capture rate of the at least one image sensor.

6. The apparatus of claim 1, wherein the apparatus is further caused to:
   provide the alert to one or more vehicles proximate the location in a direction of travel of the wrong-way driven vehicle.

7. The apparatus of claim 1, wherein the apparatus is further caused to:
   provide the alert to at least one of emergency services, law enforcement, or a transportation department.

8. The apparatus of claim 1, wherein causing the apparatus to identify, using the computer vision model, the wrong-way driven vehicle in the image comprises causing the apparatus to:
   identify a first vehicle and a heading of the first vehicle in the image;
   determine a direction of travel of a road segment along which the first vehicle is driving based on map data associated with the location; and
   identify the first vehicle as the wrong-way driven vehicle in the image based on the heading of the first vehicle being opposite the direction of travel of the road segment.

9. A computer program product comprising at least one non-transitory computer-readable storage medium having computer-executable program code instructions stored therein, the computer-executable program code instructions comprising program code instructions to:
   receive an image from at least one image sensor captured at a location of a vehicle;
   determine (i) a type of road, (ii) a number of lanes, and (iii) a direction of travel of a road segment based on matching the location of the vehicle to a digital map;
   process the image using a computer vision model to detect features within the image;
   identify, based on features detected using the computer vision model, a wrong-way driven vehicle in the image;
   increment a confidence value for detection of the wrong-way driven vehicle based on (i) the type of road, (ii) the number of lanes, and (iii) the direction of travel of the road segment;
   generate an alert indicating the presence of the wrong-way driven vehicle at the location in response to the confidence value satisfying a predetermined value; and
   generate a control signal for activation of vehicle brakes and vehicle steering of the vehicle based on (i) the type of road, (ii) the number of lanes, and (iii) the direction of travel of the road segment in order to avoid a collision between the vehicle and the wrong-way driven vehicle.

10. The computer program product of claim 9, wherein the computer vision model is trained based on a plurality of images to detect a front-side of a given vehicle.

11. The computer program product of claim 9, further comprising program code instructions to:

control a rotational movement of the at least one image sensor based on a movement of the wrong-way driven vehicle in response to the program code instructions identifying the wrong-way driven vehicle in the image.

12. The computer program product of claim 9, further comprising program code instructions to:
    allocate additional processing capacity to the at least one image sensor in response to the program code instructions identifying the wrong-way driven vehicle in the image.

13. The computer program product of claim 12, wherein the program code instructions to allocate additional processing capacity to the at least one image sensor further comprise program code instructions to increase an image capture rate of the at least one image sensor.

14. The computer program product of claim 9, further comprising program code instructions to:
    provide the alert to one or more vehicles proximate the location in a direction of travel of the wrong-way driven vehicle.

15. The computer program product of claim 9, further comprising program code instructions to:
    provide the alert to at least one of emergency services, law enforcement, or a transportation department.

16. The computer program product of claim 9, wherein the program code instructions to identify, using the computer vision model, the wrong-way driven vehicle in the image comprise program code instructions to:
    identify a first vehicle and a heading of the first vehicle in the image;
    determine a direction of travel of a road segment along which the first vehicle is driving based on map data associated with the location; and
    identify the first vehicle as the wrong-way driven vehicle in the image based on the heading of the first vehicle being opposite the direction of travel of the road segment.

17. A method comprising:
    receiving an image from at least one image sensor captured at a location of a vehicle;
    determining (i) a type of road, (ii) a number of lanes, and (iii) a direction of travel of a road segment based on matching the location of the vehicle to a digital map;
    processing the image using a computer vision model to detect features within the image;
    identifying, based on features detected using the computer vision model, a wrong-way driven vehicle in the image;
    incrementing a confidence value for detection of the wrong-way driven vehicle based on (i) the type of road, (ii) the number of lanes, and (iii) the direction of travel of the road segment;
    generating an alert indicating the presence of the wrong-way driven vehicle at the location in response to the confidence value satisfying a predetermined value; and
    generating a control signal for activation of vehicle brakes and vehicle steering of the vehicle based on (i) the type of road, (ii) the number of lanes, and (iii) the direction of travel of the road segment in order to avoid a collision between the vehicle and the wrong-way driven vehicle.

18. The method of claim 17, wherein identifying, using the computer vision model, the wrong-way driven vehicle in the image comprises:
    identifying a first vehicle and a heading of the first vehicle in the image;
    determining a direction of travel of a road segment along which the first vehicle is driving based on map data associated with the location; and
    identifying the first vehicle as the wrong-way driven vehicle in the image based on the heading of the first vehicle being opposite the direction of travel of the road segment.

* * * * *